US 6,594,082 B1

(12) United States Patent
Li et al.

(10) Patent No.: US 6,594,082 B1
(45) Date of Patent: Jul. 15, 2003

(54) OPTICAL WAVELENGTH ROUTER USING REFLECTIVE SURFACES TO DIRECT OUTPUT SIGNALS

(75) Inventors: Ming Li, Pleasanton, CA (US); Song Peng, Fremont, CA (US)

(73) Assignee: Avanex Corporation, Fremont, CA (US)

(*) Notice: Subject to any disclaimer, the term of this patent is extended or adjusted under 35 U.S.C. 154(b) by 133 days.

(21) Appl. No.: 09/794,590

(22) Filed: Feb. 26, 2001

Related U.S. Application Data

(60) Provisional application No. 60/209,733, filed on Jun. 5, 2000, provisional application No. 60/211,347, filed on Jun. 13, 2000, and provisional application No. 60/232,168, filed on Sep. 11, 2000.

(51) Int. Cl.[7] .................. G02B 26/00; G02B 27/10; G02B 6/00
(52) U.S. Cl. .................. 359/618; 359/290; 385/11
(58) Field of Search .................. 359/290, 291, 359/296, 618, 627, 122; 385/11

(56) References Cited

U.S. PATENT DOCUMENTS

| | | | | |
|---|---|---|---|---|
| 5,414,540 | A | 5/1995 | Patel .................. | 359/39 |
| 5,414,541 | A | 5/1995 | Patel .................. | 359/39 |
| 5,847,831 | A * | 12/1998 | Tomlinson et al. ......... | 359/364 |
| 5,900,985 | A * | 5/1999 | Ho et al. .................. | 359/640 |
| 6,097,859 | A * | 8/2000 | Solgaard et al. ............. | 385/17 |
| 6,163,393 | A | 12/2000 | Wu .................. | 359/127 |
| 6,201,909 | B1 | 3/2001 | Kewitsch .................. | 385/37 |
| 6,204,946 | B1 * | 3/2001 | Aksyuk et al. ............. | 359/124 |
| 6,275,623 | B1 * | 8/2001 | Brophy et al. ................ | 385/11 |
| 6,330,090 | B1 * | 12/2001 | Martin et al. ................ | 359/127 |
| 6,330,102 | B1 * | 12/2001 | Daneman et al. ........... | 359/290 |
| 6,337,935 | B1 * | 1/2002 | Ford et al. .................. | 359/127 |
| 6,342,960 | B1 * | 1/2002 | McCullough ............... | 359/124 |

FOREIGN PATENT DOCUMENTS

GB      WO 98/35251      * 8/1998

OTHER PUBLICATIONS

ITU–International Telecommunication Union, Series G: Transmission Systems and Media, Digital Systems and Networks, Optical Interfaces for Multichannel Systems with Optical Amplifiers (G.692 Oct. 1998).

* cited by examiner

Primary Examiner—Georgia Epps
Assistant Examiner—Alicia M. Harrington
(74) Attorney, Agent, or Firm—Sawyer Law Group LLP (57) ABSTRACT

An optical wavelength router utilizes a dispersive medium (e.g., a diffraction grating) and reflective surfaces. The dispersive medium separates an input optical signal (light beam) into a plurality of components, for example by wavelengths. The reflective surfaces convert the components into separate output beams traveling in the desired directions. The number and the direction of the output beams can be controlled by manipulating the angle of incidence at which the components strike the reflective surfaces. A micro-mirror array modulator serves as the reflective surfaces. Each mirror in the micro-mirror array modulator is positioned to direct individual components into a number of output signals. Alternatively, a polarization steering device which includes a polarization modulator and at least one birefringent element in addition to reflective surfaces is utilized. A Wollaston prism with a reflective surface may also be used.

15 Claims, 8 Drawing Sheets

OPTICAL WAVELENGTH ROUTER USING REFLECTIVE SURFACES TO DIRECT OUTPUT SIGNALS

RELATED APPLICATIONS

This application is related to Provisional Application No. 60/209,733 filed on Jun. 5, 2000, and Provisional Application No. 60/211,347 filed on Jun. 13, 2000, and Provisional Application No. 60/232,168 filed on Sep. 11, 2000, all of which are herein incorporated by reference in their entirety.

BACKGROUND

1. Field of the Invention

The present invention relates generally to the field of optical communications, and more specifically, to routing optical signals.

2. Discussion of Related Art

Communication networks increasingly rely upon optical fiber for high-speed, lowcost transmission. Optical fibers were originally envisioned as an optical replacement for electronic transmission media, such as high-speed coaxial cable and lower-speed twisted-pair cable. However, even high-speed optical fibers are limited by the electronics at the transmitting and receiving ends. For switching purposes, operating speeds are generally rated at a few gigabits per second, although 40 Gb/s systems have been prototyped. Such high-speed electronic systems are expensive and still do not fully exploit the inherent bandwidth of fiber-optic systems, which can be measured in many terabits per second.

All-optical transmission systems offer many intrinsic advantages over systems that use electronics within any part of the principal transmission path. Wavelength division multiplexing is a commonly used technique that allows the transport of multiple optical signals, each at a slightly different wavelength, on an optical fiber. The ability to carry multiple signals on a single fiber allows that fiber to carry a tremendous amount of traffic, including data, voice, and even digital video signals. For example, the use of wavelength division multiplexing, in combination with time division multiplexing, permits a long distance telephone company to carry thousands or even millions of phone conversations on a single fiber. Wavelength division multiplexing makes it possible to effectively use the fiber at multiple wavelengths, as opposed to the costlier option of installing additional fibers.

Using wavelength division multiplexing, optical signals can be carried on separate optical channels with each channel having a wavelength within a specified bandwidth. It is advantageous to carry as many channels as possible within the bandwidth where each channel corresponds to an optical signal transmitted at a predefined wavelength. Separating and combining, or demultiplexing and multiplexing, wavelengths with such close channel spacings requires optical components that have high peak transmission at the specified wavelengths and which can provide good isolation between the separated wavelengths.

U.S. Pat. No. 4,655,547 to Heritage, et. al., entitled "Shaping Optical Pulses by Amplitude and Phase Masking," which is herein incorporated by reference, discloses how an input optical signal can be divided into frequency components, where each frequency component is separately phase-modulated or amplitude-modulated. The input signals can be divided into spatially separated frequency components with a diffraction grating. Then, the separated channels are independently operated upon by a segmented modulator. U.S. Pat. No. 5,132,824 to Patel et al., entitled "Liquid Crystal Modulator Array," which is also herein incorporated by reference, discloses using liquid-crystal modulators to manipulate optical pulses.

Currently-available wavelength routing techniques do not achieve sufficient switching contrast between individual wavelengths on a closely-spaced grid and usually involve unacceptable crosstalk between separate channels. Therefore, there is a need for a wavelength routing device which maintains a high degree of switching contrast and is able to separate or combine large numbers of wavelengths.

SUMMARY

According to the present invention, a wavelength division multiplexed router that switches optical signals in the optical domain is disclosed. The router includes a dispersive medium that separates an input optical signal into separate optical signals or separated components, where each component corresponds to a light beam of a unique wavelength. "Optical," as used herein, is not limited to the visible spectrum but includes electromagnetic radiation capable of being carried on optical fiber. Each component of the input optical signal is focused onto a reflective surface positioned to reflect the incident component in a preselected direction. Each reflected component travels back toward the dispersive medium in its respective direction and strikes the dispersive medium, which recombines certain components into a desired number of output signals. Each output signal travels through an optical medium as a separate signal.

One embodiment of the present invention utilizes a micromirror array modulator, which uses an array of mirrors as reflective surfaces. In some embodiments, each mirror that acts as the reflective surface is fixed in one of a limited number of angles. For example, in order to effectuate a 1×2 wavelength router, each mirror is fixed in one of two angles. The reflected components travel back to the dispersive medium that initially separated an optical signal into multiple components. The dispersive medium combines the components into a desired number of output signals where some or all of the output signals may include one or more of the components of the input signal.

Other embodiments include a polarization steering device, including at least one polarization modulator, at least one birefringent polarization beam displacer, and reflective surfaces. The polarization modulator manipulates the polarization states of the component. The birefringent polarization beam displacer directs the component along a first path or a second path depending on the polarization states defined by the polarization modulator. Light beam components traveling along the first path are reflected by surfaces positioned at different angles than components traveling along the second path. The reflected components propagate back through the dispersive medium. During the propagation through the dispersive medium, the components may be recombined with other components. The combined signals, then, can be coupled into a signal transfer medium, for example optical fiber. Therefore, a single input signal can be separated into its individual wavelength components and each of the individual components can be directed into one of a number of output signals. The output signals can be coupled out of the router. The overall effect of the router is the separation of single input signal into a preselected number of output signals traveling in the desired directions.

If the polarization steering device described above contains one birefringent polarization beam displacer, it will be generally useful with an input signal of uniform polarization state. When the input signal is arbitrarily polarized, a pre-conditioning apparatus is needed to uniformly polarize the input signal. A pre-conditioning apparatus includes a birefringent polarization beam displacer that divides the input signal into two components of orthogonal polarization states, and a half-wave waveplate that rotates one of the two components.

The embodiments of polarization steering device that include two birefringent polarization beam displacers do not need the pre-conditioning apparatus described above even when the input signal is arbitrarily polarized. One embodiment configured with birefringent polarization beam displacers includes a polarization-rotating element sandwiched between two birefringent polarization beam displacers and a reflective Wollaston prism. The polarization-rotating element may be, for example, a half-wave waveplate. A polarization steering device configured with a polarization-rotating element sandwiched between two birefringent polarization beam displacers ensures that the travel distance of all components passing through the polarization steering device is substantially equal. The substantially equal travel distance minimizes polarization mode dispersion and prevents a distortion of the output signals.

These and other embodiments of the invention will be more fully understood from the following detailed description which should be read in light of the following Figures.

BRIEF DESCRIPTION OF THE FIGURES

The Figures are not drawn to scale.

DETAILED DESCRIPTION

Figure 1:
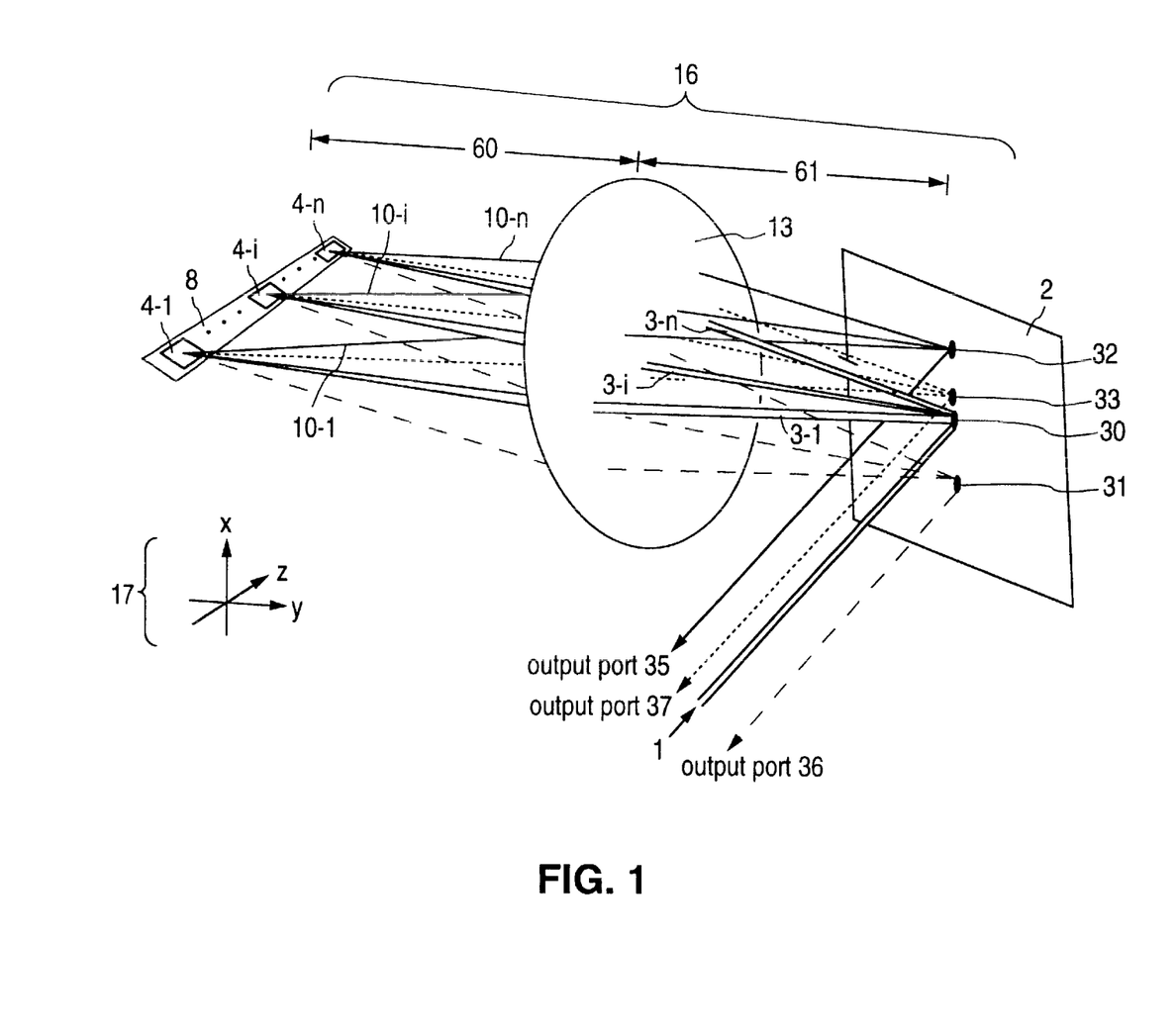
FIG. 1 shows a ray diagram that depicts the paths of light rays in an embodiment of a 1×N wavelength router according to the present invention which includes a reflective apparatus.

FIG. 1 shows an embodiment of a 1×N router 16 that includes reflective apparatus 8, lens 13, and dispersive medium 2. Reflective apparatus 8 includes n number of pixels 4-1 through 4-n according to the present invention (the conventional mechanical elements are not depicted for simplicity). Pixels 4-1 through 4-n are aligned along the z-direction as defined by coordinate system 17. A single, broadband optical input signal 1 (a light beam) travels substantially in the z-direction as defined by coordinate system 17, toward spot 30 of dispersive medium 2. Input signal 1 includes a multiplexed multichannel set of optical signals. Dispersive medium 2 is typically a wavelength-dispersive medium, for example a diffraction grating or a prism. Dispersive medium 2 divides input signal 1 into wavelength-separated input components 3-1 through 3-n, shown by double-solid-lines in FIG. 1. Each of the multiplexed multi-channel signals is separated into one of the wavelength-separated input components 3-1 through 3-n. The wavelength-separated input components 3-1 through 3-n travel substantially in the negative y-direction as defined by coordinates 17, toward lens 13. Lens 13 focuses each of the input components 3-1 through 3-n onto pixels 4-1 through 4-n of reflective apparatus 8. Lens 13 may be a set of two or more lens elements. Input components 3-1 through 3-n each strike one of pixels 4-1 through 4-n. Therefore, the number of pixels (n) and the number of input components (n) is the same.

As used herein, pixel 4-i refers to an arbitrary one of pixels 4-1 through 4-n and input component 3-i refers to an arbitrary one of input components 3-1 through 3-n. Pixel 4-i directly or indirectly reflects incident input component 3-i back to dispersive medium 2 in a selected direction. The wavelength-separated light beam traveling from reflective apparatus 8 back to dispersive medium 2 is referred to as output component 10-i, which is one of output components 10-1 through 10-n. In the 1×N router of FIG. 1, each of pixels 4-1 through 4-n is configured to reflect an incident input component 3-i at any one of N angles. The output components 10-1 through 10-n travel back to lens 13. The angle at which each output component 10-1 through 10-n travels is determined by the setting of the particular pixel that directs the particular output component.

Lens 13 focuses input components 3-1 through 3-n onto pixels 4-1 through 4-n. Also, lens 13 directs output components 10-1 through 10-n onto dispersive medium 2. By passing through lens 13, each input component 3-1 through 3-n and each output component 10-1 through 10-n are collimated. In order to achieve the collimation, lens 13 may be spaced first focal length 60 away from the plane of reflective apparatus 8. First focal length 60 is the focal length of lens 13 in the medium (e.g., air) between lens 13 and reflective apparatus 8. Lens 13 may also be spaced by second focal length 61 from dispersive medium 2. Second focal length 61 is the focal length of lens 13 in the medium between lens 13 and dispersive medium 2.

Output components 10-1 through 10-n that strike the same spot on dispersive medium 2 are directed into the same output port. The maximum number of output ports (N) depends on the number of settings of pixel 4-i. The setting of pixel 4-i determines the direction of output component 10-i. The number of available settings affects the number of directions in which output component 10-i can travel, which in turn affects the number and the position of spots on dispersive medium 2 that output components 10-1 through 10-n pass through. The number of spots on dispersive medium 2 through which output components 10-1 through 10-n pass is equal to the number of output ports.

FIG. 1 depicts three possible directions in which output components 10-1 through 10-n can travel. The different directions are illustrated with solid lines, dotted lines, and broken lines. In the exemplary embodiment of FIG. 1, each of the pixels 4-1 through 4-n can be set to reflect an incident input component 3-1 through 3-n in any one of the three directions. When reflective apparatus 4-i is set to reflect output component 4-i in the direction of the solid lines, the output component 10-i is directed by lens 13 onto spot 32 of dispersive medium 2. Output components reflected by other pixels in the direction shown by the solid lines are also directed on spot 32 of dispersive medium 2 and directed into first output port 35. Similarly, pixels 4-1 through 4-n can each be set to reflect an incident input component 3-1 through 3-n in the direction shown by the broken lines. The output components 10-1 through 10-n traveling in the direction of the broken lines are directed by lens 13 onto spot 31 of dispersive medium 2. From spot 31, output components travel toward second output port 36. Likewise, pixels 4-1 through 4-n can be set to reflect output components 10-1 through 10-n in the direction of the dotted lines. In that case, output components 10-1 through 10-n are directed by lens 13 onto spot 33 of dispersive medium 2. Output components 10-1 through 10-n are directed onto spot 33 and travel toward third output port 37.

Figure 2:
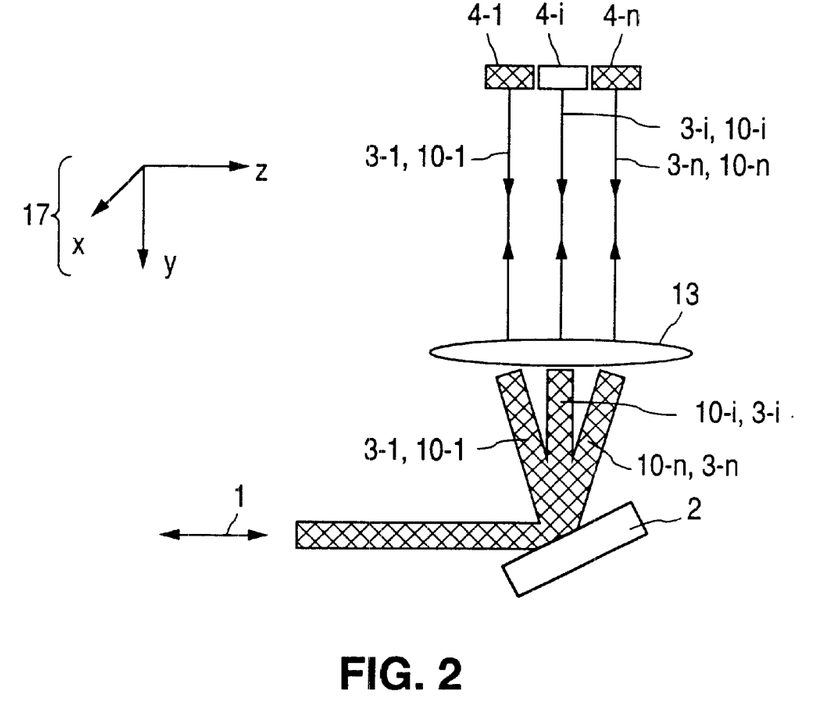
FIG. 2 schematically depicts the paths of light rays in an embodiment of a 1×N wavelength router according to the present invention from the y-z plane.

FIG. 2 shows a view of router 16 from the y-z plane. While dispersive medium 2 separates input signal 1 into input components 3-1 through 3-n substantially along the z-direction as defined by coordinate system 17, the angle of reflection at pixels 4-1 through 4-n lies substantially in the x-y plane as defined by coordinate system 17. Since output components 10-1 through 10-n are separated from input components 3-1 through 3-n in the x-y plane as defined by coordinate system 17, only the wavelength-separated components can be seen from the y-z plane perspective. FIG. 2 shows that the paths of input components 3-1 through 3-n differ from the paths of output components 10-1 through 10-n only along the x-direction as defined by coordinate system 17. Thus, spots 30 through 33 on dispersive element 2 are separated along the x-direction as defined by coordinate system 17, as shown in FIG. 1.

Figure 3:
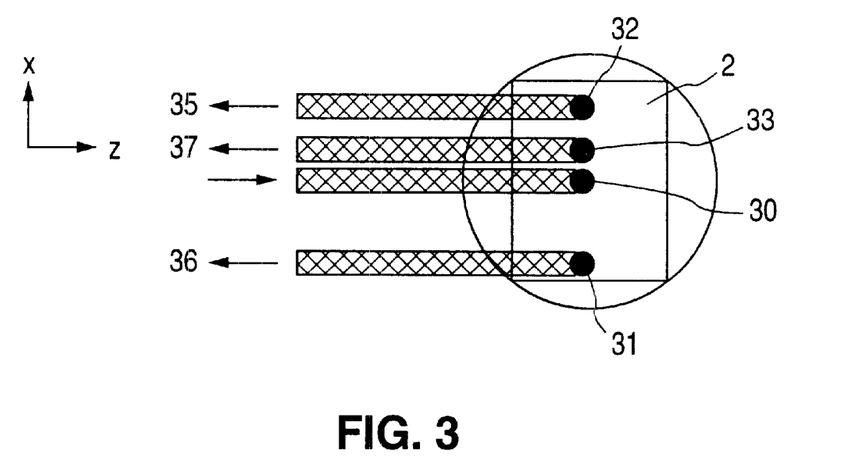
FIG. 3 schematically depicts an input signal and three output signals striking a dispersive medium used in a 1×N wavelength router according to the present invention.

Even if output components are displaced along the y-direction as defined by coordinate system 17, the output components are combined into the same output port by dispersive medium 2. FIG. 3 shows dispersive medium 2 from the x-z plane. Spots 30 through 33 on dispersive medium 2 in FIG. 3 correspond to spots 30 through 33 in FIG. 1. Output components 10-1 through 10-n that travel in separate paths through lens 13 are grouped into spots 30 through 33 on dispersive medium 2.

Figure 4:
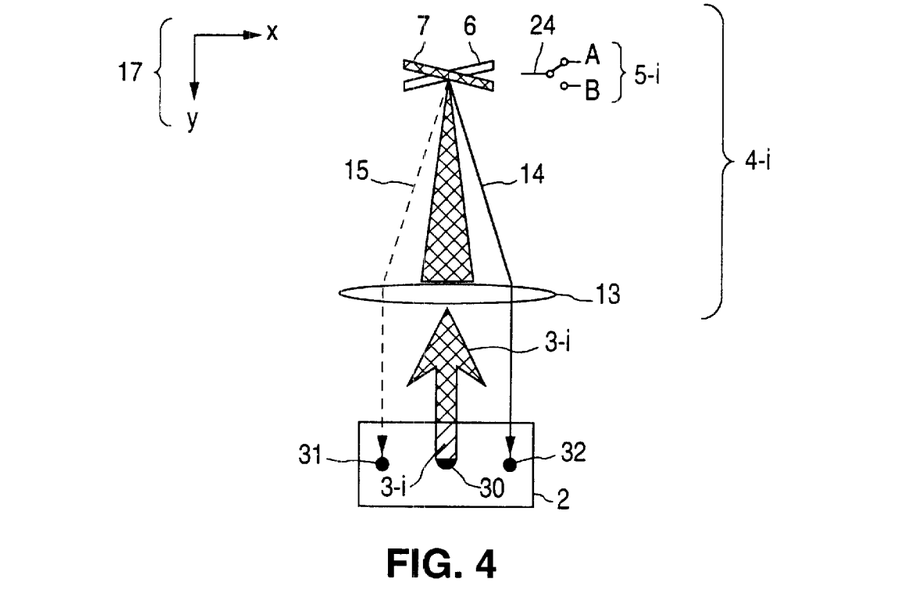
FIG. 4 schematically depicts a 1×2 micro-mirror array modulator of the present invention and two different paths in which a light ray can travel through the micro-mirror array modulator.

In one embodiment, pixel 4-i is a micro-mirror as shown in FIG. 4. Each micro-mirror pixel 4-i includes reflective surface 5-i that may be adjustable in position and/or angle. Reflective surface 5-i denotes the reflective surface that is a part of micro-mirror pixel 4-i. Lens 13 focuses input component 3-i onto reflective surface 5-i. Although reflective surface 5-i can be made to reflect input component 3-i in N number of different directions, FIG. 4 shows reflective surface 5-i in which N=2 for simplicity. In FIG. 4, reflective surface 5-i can be positioned in angle 6 or angle 7. If reflective surface 5-i is positioned in angle 6, it reflects an incident input component 3-i in the positive-x direction as defined by coordinate system 17 and as depicted by path 14 shown in solid line. On the other hand, if reflective surface 5-i is positioned in angle 7, it reflects incident input component 3-i in the negative-x direction as depicted by path 15 shown in broken line. Among the n number of micro-mirror pixels that are included in router 16, some micro-mirror pixels may be fixed in position 6 and some micro-mirrors may be positioned in angle 7. The micro-mirror array shown in FIG. 4 is similar to Texas Instruments' micro-mirror devices used in display applications. Thus, the micro-mirror array used in the embodiment of FIG. 4 may be custom ordered and purchased.

Figure 5:
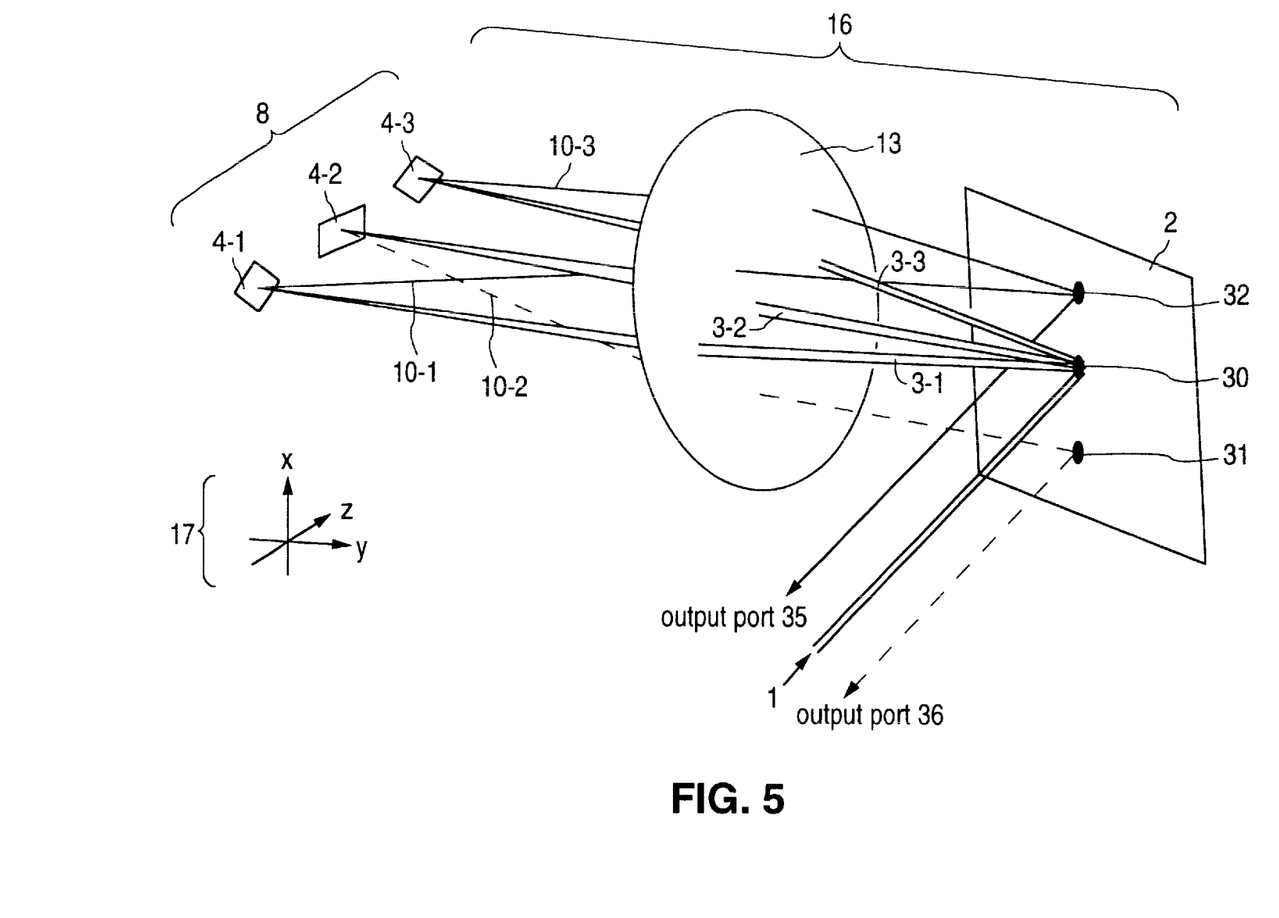
FIG. 5 shows a ray diagram that depicts an embodiment of a 1×2 wavelength router according to the present invention which includes a micro-mirror array modulator.

FIG. 5 shows an exemplary 1×2 router 16 (N=2) including reflective apparatus 8 (here a micro-mirror array modulator 8) according to the present invention. In this exemplary embodiment, reflective apparatus 8 includes micro-mirror pixels 4-1 through 4-3 (n=3). Reflective surfaces 5-1 and 5-3 of micro-mirror pixels 4-1 and 4-3 are positioned in angle 6. Thus, input components 3-1 and 3-3 that travel back as output components 10-1 and 10-3 are reflected in the positive x-direction as defined by coordinate system 17 (following path 14 of FIG. 4). Lens 13 directs output components 10-1 and 10-3 onto spot 32 of dispersive medium 2, as shown by the solid lines. From spot 32, output components 10-1 and 10-3, which are separated by wavelength, travel toward output port 35. Unlike input components 3-1 and 3-3, input component 3-2 is incident on reflective surface 5-2 that positioned in angle 7. After striking reflective surface 5-2, output component 10-2 is reflected in the negative-x direction as defined by coordinate system 17 (following path 15 of FIG. 4). Lens 13 focuses output component 10-2 onto spot 31 of dispersive medium 2. From spot 31, output component 10-2 propagates toward output port 36. Exactly which of the micro-mirror array modulators produce output components that follow the solid lines and which micro-mirror array modulators produce output components that follow the broken lines depend on the position of the reflective surface 5-1 through 5-3. A reflective surface 5-i may include but is not limited to a mirror or a metallic surface.

Figure 6:
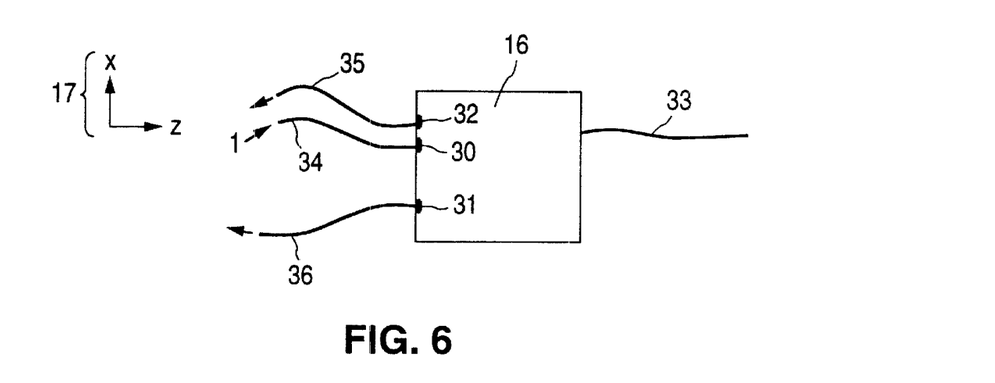
FIG. 6 schematically depicts an input signal entering and two output signals exiting a 1×2 wavelength router according to the present invention.

FIG. 6 shows that after output components 10-1–10-3 of FIG. 5 define spots 32 and 31 of dispersive medium 2, they are coupled into a signal transfer medium (not shown) through first output port 35 and second output port 36, respectively. The signal transfer medium is, for example, an optical fiber. Input signal 1 traveling through a signal transfer medium reaches router 16 through input port 34. Input signal 1 passes through input port 34 in substantially the z-direction as defined by coordinate system 17.

Output signals including output components 10-1 through 10-n travel through first output port 35 and second output port 36 in directions substantially reverse to the direction in which input signal 1 travels. Electrical signals 33 control the positions of reflective apparatus 4-1 through 4-n and thereby combine each output component 10-1 through 10-n into output signals. As previously explained, the position and the angle of reflective apparatus 4-1 through 4-n determine the spot on dispersive medium 2 that output component 10-1 through 10-n will strike, and the spot on dispersive medium 2 in turn determines how the output components 10-1 through 10-n combine. Output signals are coupled into the proper signal transfer mediums through output ports 35 and 36.

Figure 7A:
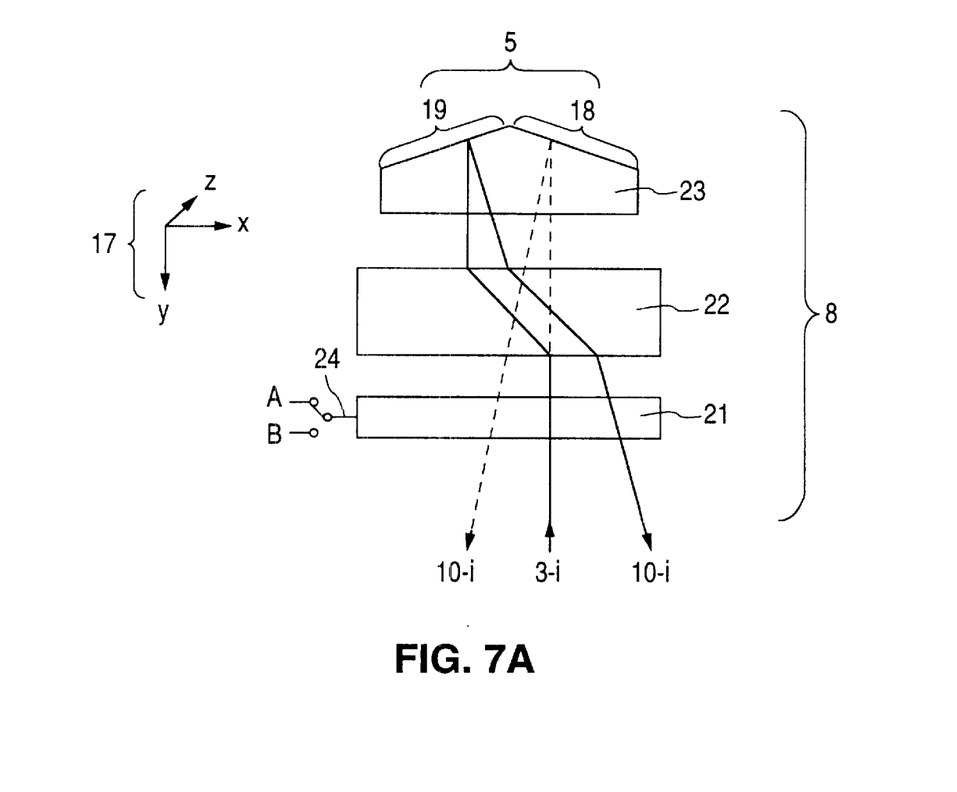
FIG. 7A schematically depicts two different paths in which a light ray can travel through one embodiment of a polarization steering device having a polarization modulator that is not segmented along the x-direction.
Figure 7B:
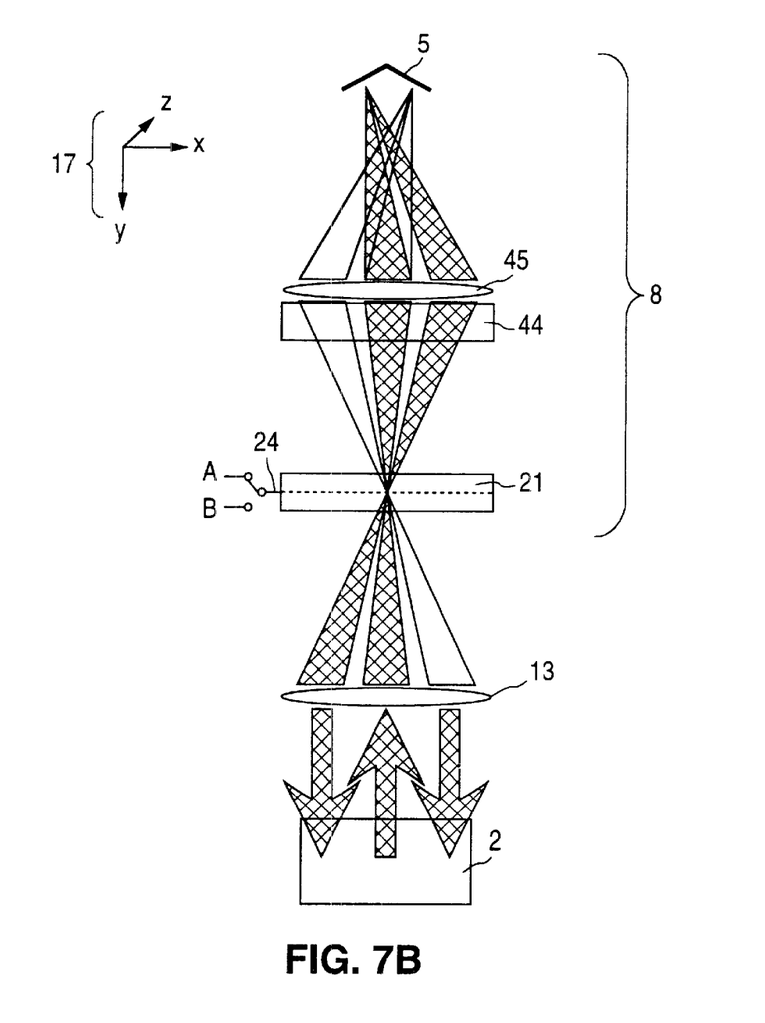
FIG. 7B schematically depicts two different paths in which a light ray can travel through an embodiment of the polarization steering device having a birefringent wedge.
Figure 9A:
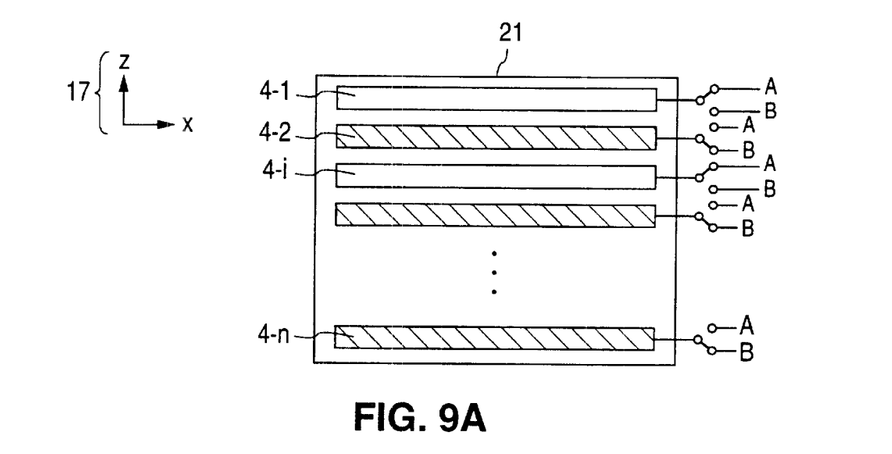
FIG. 9A schematically depicts a polarization modulator segmented along the z-axis from the x-z plane.
Figure 9B:
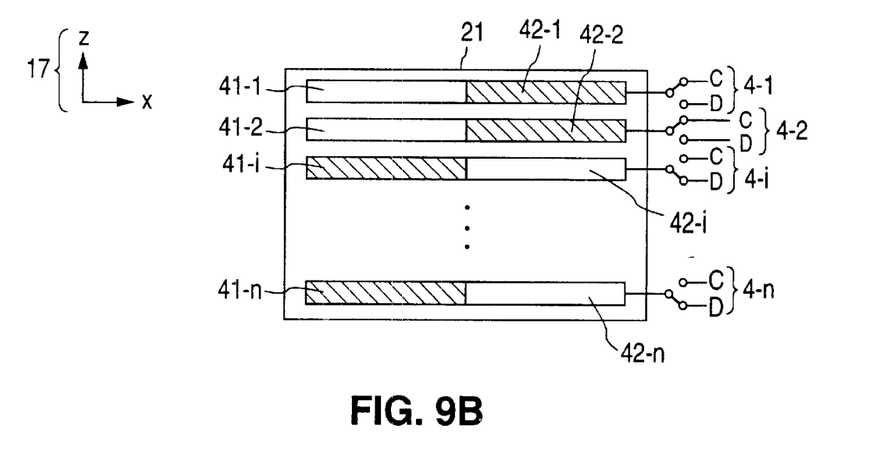
FIG. 9B schematically depicts a polarization modulation segmented along the z-axis and the x-axis from the x-z plane.

In some embodiments, reflective apparatus 8 includes a polarization steering device instead of a micro-mirror array modulator. Unlike a micro-mirror array that may be purchased with a custom order, polarization steering device 8 is made using conventional optical elements. FIG. 7A and FIG. 7B show a polarization steering device version of reflective apparatus 8 which includes polarization modulator 21. As FIG. 9A and FIG. 9B show, polarization modulator 21 includes segment pixels 4-1 through 4-n. Polarization modulator 21 is, for example, a liquid crystal polarization modulator. The specific type of polarization modulator to be utilized for polarization steering device 8 depends at least partly on whether input signal 1 is uniformly polarized or arbitrarily polarized. When input signal 1 is uniformly polarized along the x- or the z-direction as defined by coordinate system 17, polarization steering device 8 may include polarization modulators segmented only along the z-direction as defined by coordinate system 17. FIG. 9A shows the segment pixels 4-1 through 4-n of polarization modulator 21 as seen from the x-z plane. On the other hand, when input signal 1 is arbitrarily polarized, polarization steering device 8 may include polarization modulators that are segmented along the x-direction and along the z-direction, as defined by coordinate system 17. FIG. 9B shows polarization modulator 21 that is segmented along both the x-direction and the z-direction. In polarization modulator 21 of FIG. 9B, each segment pixel 4-1 through 4-n is subdivided into subdivided into sub-pixels 41-1 through 41-n and sub-pixels 42-i through 42-n.

The polarization steering device of reflective apparatus 8 can include at least one polarization modulator 21, at least one birefringent polarization beam displacer 22, and at least one reflective element 23, as shown in FIG. 7A. Input component 3-i is polarized in a selected direction by segment pixel 4-i of polarization modulator 21. Each segment pixel 4-i of polarization modulator 21 receives a control signal 24. In response to control signal 24, each of the segment pixels 4-1 through 4-n polarizes input component 3-i in the z-direction or in the x-direction as defined by coordinate system 17. Birefringent polarization beam displacer 22, which for example can be calcite crystal or a yttrium vanadate crystal, passes light polarized along the z-direction and displaces light polarized along the x-direction. Reflective element 23 may have reflector 18 positioned to send output component 10-i along the path indicated by the broken line and reflector 19 positioned to send output component 10-i along the path indicated by the solid line. Therefore, segment pixel 4-i can direct light into either output port 35 or output signal 36 in response to control signal 24.

Segment pixels 4-1 through 4-n of polarization modulator 21 manipulate the state of polarization of input component 3-1 through 3-n. Depending on control signal 24, each segment pixel 4-i, for example, does not affect the polarization of input component 3-i, rotates the polarization direction of input component 3-i by ninety degrees, or rotates the polarization direction of input component 3-i by an odd multiple of ninety degrees. In polarization modulator 21 of FIG. 9A, which is segmented only along the z-direction as defined by coordinate system 17, segment pixel 4-i either rotates the polarization of input component 3-i by ninety degrees (or an odd multiple thereof) or does not rotate the polarization at all. As shown in FIG. 9B, polarization modulator 21 may be segmented along the x-direction as well as the z-direction as defined by coordinate system 17. The two sub-pixels 41-i and 42-i of segment pixel 4-i may be coupled so that one sub-pixel rotates the polarization of an incident beam while the other sub-pixel does not affect the polarization at all. As used herein, a sub-pixel or a segment pixel that rotates the polarization of input component 3-i is referred to as a "rotating segment." A sub-pixel or a segment pixel that does not affect the polarization of input component 3-i is referred to as a "non-rotating segment."

Birefringent polarization beam displacer 22 is typically made of a birefringent material, for example calcite, yttrium vanadate, or yttrium orthovanadate. In a birefringent material, there is one particular direction known as the optic axis. In general, when arbitrarily polarized light falls at an angle to the optic axis, two rays result. One ray, commonly referred to as the ordinary ray, passes straight through the birefringent material in a normal way. The other ray, referred to as the extraordinary ray, is refracted at an angle. The ordinary ray and the extraordinary ray are linearly-polarized in mutually perpendicular directions. Thus, birefringent polarization beam displacer 22 directs incident input component 3-i in different directions depending on the polarization state. The degree of beam displacement is linearly proportional to the thickness of the polarization beam displacer and the required displacement can be small, typically in the range of a few hundred micrometers. Thus, a thin birefringent polarization beam displacer is sufficient to practice the present invention.

The polarization steering device of reflective apparatus 8 shown in FIG. 7A is useful when broadband input signal 1 has only one state of polarization, either in the x-direction or the z-direction as defined by coordinate system 17. While micro-mirror array modulator of reflective apparatus 8 in FIG. 5 controls the direction of output component 10-i by adjusting the angle of reflective surface 5-i, polarization steering device 8 of FIG. 7A achieves the same result by directing input component 3-i to one of the two reflective parts 18, 19 that are fixed at different angles. Whether input component 3-i strikes reflective part 18 or reflective part 19 of reflective surface 5 depends on the polarization state of input component 3-i and the state of polarization modulator 21. The angle of reflection at reflective surface 5 depends on whether input component 3-i strikes reflective part 18 or reflective part 19, and the angle of reflection affects the direction of output component 10-i.

In the embodiment of FIG. 7A, segment pixels 4-1 through 4-n of polarization modulator 21 modulate the polarization states of input components 3-1 through 3-n. Each segment pixel 4-i of polarization modulator 21 can be switched into one of two settings: setting A which does not affect the polarization direction of input component 3-i, and setting B which rotates the polarization direction of input component 3-i by ninety degrees or an odd multiple of ninety degrees. For purposes of illustration, input component 3-i is polarized in the z-direction. If segment pixel 4-i of polarization modulator 21 were in setting A, input component 3-i remains polarized in the z-direction as defined by coordinate system 17 after passing through polarization modulator 21. Since the optic axis of birefringent polarization beam displacer 22 lies in the x-y plane as defined by coordinate system 17, as mentioned above, input component 3-i that is polarized in the z-direction as defined by coordinate system 17 passes through the birefringent polarization beam displacer 22 without being displaced. Input component 3-i that does not get displaced then reaches surface 18 of reflective surface 5 as shown by the broken line. Output component 10-i is reflected in the negative-x direction as defined by coordinate system 17. In contrast, if segment pixel 4-i were in setting B, input component 3-i would be polarized in the x-direction after passing through polarization modulator 21. Birefringent polarization beam displacer 22 would then displace input component 3-i along the x-axis, making input component 3-i strike surface 19 of the reflective surface 5. Surface 19 of reflective surface 5-i reflects output component 10-i in the positive x-direction as defined by coordinate system 17.

In order to effectuate a 1×2 wavelength router polarization steering device 8 must have at least two segment pixels, for example pixel 4-1 and pixel 4-2. When polarization steering device 8 of FIG. 7A is used in router 16, segment pixels in setting A produce output components shown in broken lines. Segment pixels in setting B produce output components shown in solid lines. As shown in FIG. 1, output components shown in broken lines strike dispersive medium 2 at spot 31 and propagate toward output port 36. Output components shown in solid lines strike dispersive medium 2 at spot 32 and propagate toward output port 35.

Figure 8:
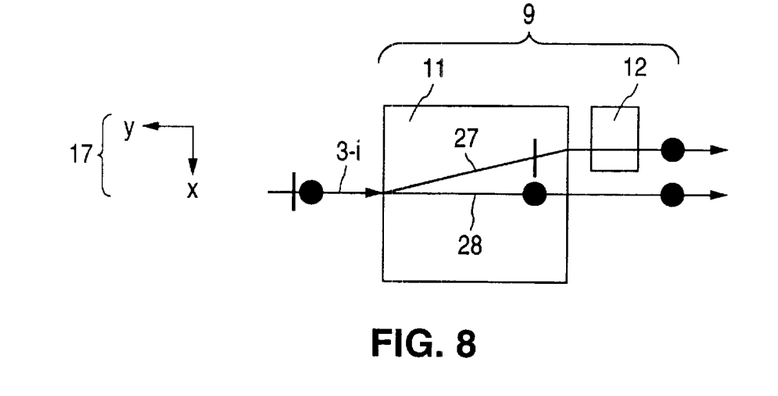
FIG. 8 schematically depicts an exemplary pre-conditioning apparatus that may be used for converting an arbitrarily polarized input signal into components of uniform polarization state.

Various modifications may be made to the polarization steering devices described above. For example, polarization steering device 8 in FIG. 7B utilizes Wollaston prism 44 and lens 45 instead of birefringent polarization beam displacer 22 in FIG. 7A. Also, a person of ordinary skill in the relevant art would understand of modifications necessary for adapting polarization steering device 8 of FIG. 7A and FIG. 7B to arbitrarily polarized input signal 1. For example, input signal 1 may be pre-conditioned into a single polarization state before being put through polarization steering device 8 of FIG. 7A and FIG. 7B. The pre-conditioning may be achieved through pre-conditioning apparatus 9 shown in FIG. 8, which includes birefringent polarization beam displacer 11 and a half-wave waveplate 12. Birefringent polarization beam displacer 11 separates arbitrarily polarized input component 3-i into sub-component 27 and sub-component 28 of orthogonal polarization states. FIG. 8 indicates the two orthogonal polarization states with a dot and a line. Input component 3-i traveling along the negative y-direction as defined by coordinate system 17 is arbitrarily polarized, as it is marked with both a dot and a line. Upon entering birefringent polarization beam displacer 11 that has an optic axis lying in the x-y plane as defined by coordinate system 17, input component 3-i separates into sub-component 27 that is polarized in the x-direction (indicated with a line) and sub-component 28 that is polarized in the z-direction (indicated with a dot). Only sub-component 27 enters half-wave waveplate 12, which rotates the polarization by ninety degrees. As indicated by the dot on sub-component 27 exiting half-wave waveplate 12, sub-component 27 becomes polarized in the z-direction as defined by coordinate system 17. Both sub-components 27 and 28 are polarized in the z-direction after passing through pre-conditioning apparatus 9. By converting arbitrarily polarized input signal 1 into sub-components 27 and 28 of uniform polarization state, pre-conditioning apparatus 9 allows polarization steering device 8 of FIG. 7A and FIG. 7B to be used even when input signal 1 is arbitrarily polarized.

Figure 10A:
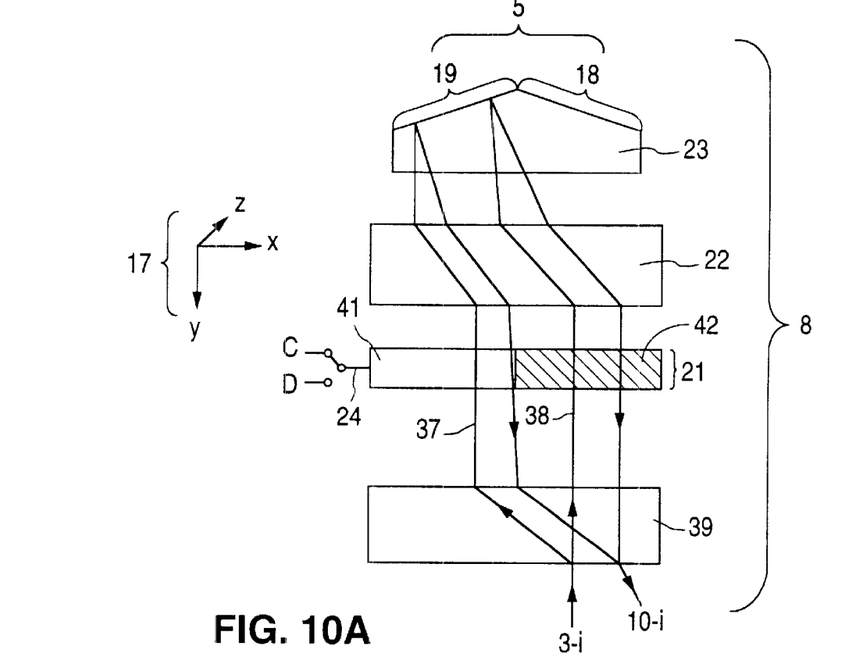
FIG. 10A and FIG. 10B schematically depict two different paths in which a light ray can travel through an embodiment of the polarization steering device having a two-segment polarization modulator.
Figure 10B:
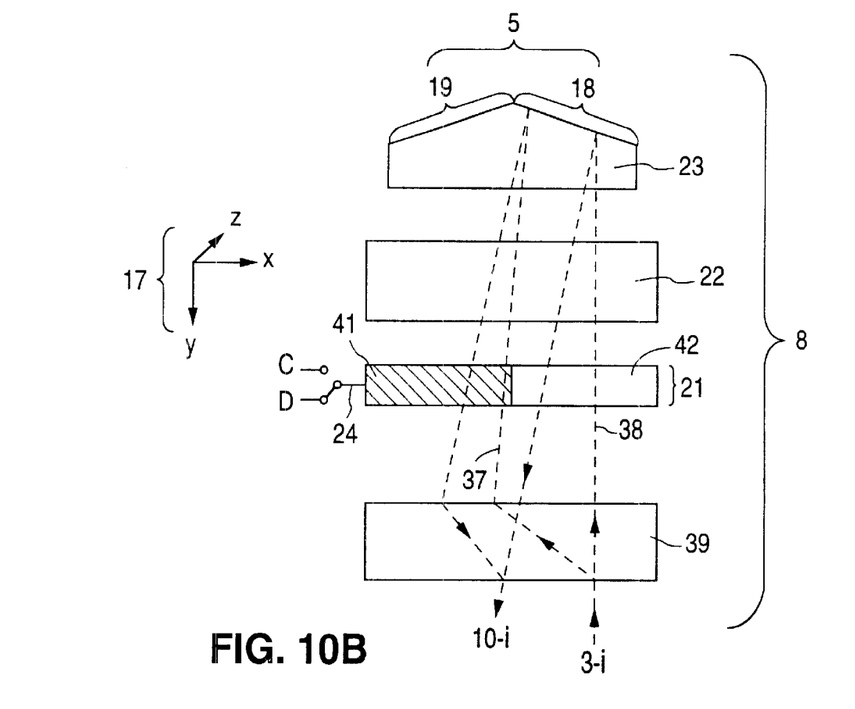

When input signal 1 is arbitrarily polarized, reflective apparatus 8 may include polarization steering device 8 of FIG. 10A and FIG 10B. Polarization steering device 8 of FIG. 10A and FIG. 10B includes birefringent polarization beam displacer 39 in addition to polarization modulator 21, birefringent polarization beam displacer 22, and angled reflector 23 having reflective surface 5. Birefringent polarization beam displacer 39 can be used to separate input component 3-i into sub-component 37 and sub-component 38 of orthogonal polarization states. Sub-component 37 is polarized in the x-direction as defined by coordinate system 17 and sub-component 38 is polarized in the z-direction as defined by coordinate system 17.

Polarization steering device 8 shown in FIG. 10A and FIG. 10B utilizes a polarization modulator 21 segmented in both the z-direction and the x-direction. FIG. 9B shows sub-pixels 41-1 through 41-n and sub-pixels 42-1 through 42-n of segment pixels 4-1 through 4-n that are included in polarization modulator 21. Sub-pixels 41-i and 42-i, which are sub-pixels of an arbitrary segment pixel 4-i, are coupled to align the polarization directions of sub-components 37 and 38. In FIG. 10A and FIG. 10B, sub-component 37 and sub-component 38 enter sub-pixel 41-i and sub-pixel 42-i of polarization modulator 21, respectively. Like the segment pixels 4-1 through 4-n of FIG. 9A, segment pixels 4-1 through 4-n in FIG. 9B has two settings. When segment pixel 4-i is in setting C, sub-pixel 42-i rotates the polarization state of sub-component 38 by ninety degrees whereas sub-pixel 41-i does not rotate the polarization state of sub-component 37. When segment pixel 4-i is in setting D, on the other hand, sub-pixel 41-i rotates the polarization state of sub-component 37 by ninety degrees (or an odd multiple of ninety degrees) and segment 42-i does not affect the polarization state of sub-component 38. Both FIG. 10A and FIG. 10B show the rotating segment of polarization modulator 21 as the shaded segment and the non-rotating segment as the unshaded segment.

FIG. 10A illustrates the path of input component 3-i when polarization steering device 4-i is in setting C. Assuming that input component 3-i is arbitrarily polarized, birefringent polarization beam displacer 39 divides component 3-i into sub-component 37 polarized in the x-direction and sub-component 38 polarized in the z-direction, as defined by coordinate system 17. However, after passing through segment pixel 4-i in setting C, both sub-components 37 and 38 are polarized in the x-direction as defined by coordinate system 17. Sub-component 38 becomes polarized in the x-direction by segment 42-i, which is the rotating segment. Sub-component 37, on the other hand, remains polarized in the x-direction because it passes through the non-rotating sub-pixel 41-i. When sub-components 37 and 38 enter birefringent polarization beam displacer 22 that has an optical axis in the x-y plane as defined by coordinate system 17, sub-components 37 and 38 are displaced along the x-direction as defined by coordinate system 17. Sub-components 37 and 38 strike surface 19 of reflective surface 5 and travel back toward dispersive medium 2 passing through the same elements they passed through to reach reflective surface 5. However, sub-components 37 and 38 travel back at an angle in the x-direction relative to the path they took to reach reflective surface 5. Birefringent polarization beam displacer 39 recombines sub-components 37 and 38 into output component 10-i.

FIG. 10B illustrates the path of input component 3-i when polarization steering device 4-i is in setting D. As in FIG. 10A, birefringent polarization beam displacer 39 divides input component 3-i into sub-component 37 and sub-component 38 polarized in the x- and the z-direction respectively, as defined by coordinate system 17. After passing through polarization modulator 21, sub-component 37, which passes through rotating sub-pixel 41-i, becomes polarized in the z-direction. Sub-component 38, on the other hand, passes through non-rotating segment 42-i and remains polarized in the z-direction as defined by coordinate system 17. Sub-components 37 and 38, both polarized in the z-direction as defined by coordinate system 17, pass through birefringent polarization beam displacer 22 without displacement. Therefore, sub-components 37 and 38 strike surface 18 of reflective surface 5 and are reflected back toward dispersive element 2. Sub-components 37 and 38 travel back passing through the same elements they passed through to reach reflective surface 5. Sub-components 37 and 38 travel back at an angle in the negative x direction to the path they took to reach reflective surface 5. Birefringent beam displacer 39 recombines sub-components 37 and 38 into output component 10-i.

One by two router 16 that utilizes polarization steering device 8 of FIG. 10A and FIG. 10B may have one or more polarization steering devices in setting C and/or one or more polarization steering devices in setting D. Input component 3-i that enters polarization modulator 21 through a segment pixel 4-i in setting C travels in the path indicated by the solid lines in FIG. 10A and exits the polarization steering device as output component 10-i. The output components that travel through segment pixels having setting C, all shown as solid lines, focus onto spot 32 of dispersive medium 2 (FIG. 1). Similarly, output components that travel through segment pixels in setting D, shown by the broken lines in FIG. 10B, focus onto spot 31 of dispersive medium 2 (FIG. 1). From spot 32 and spot 31, the output components are coupled into output ports 35 and 36, respectively.

Figure 11:
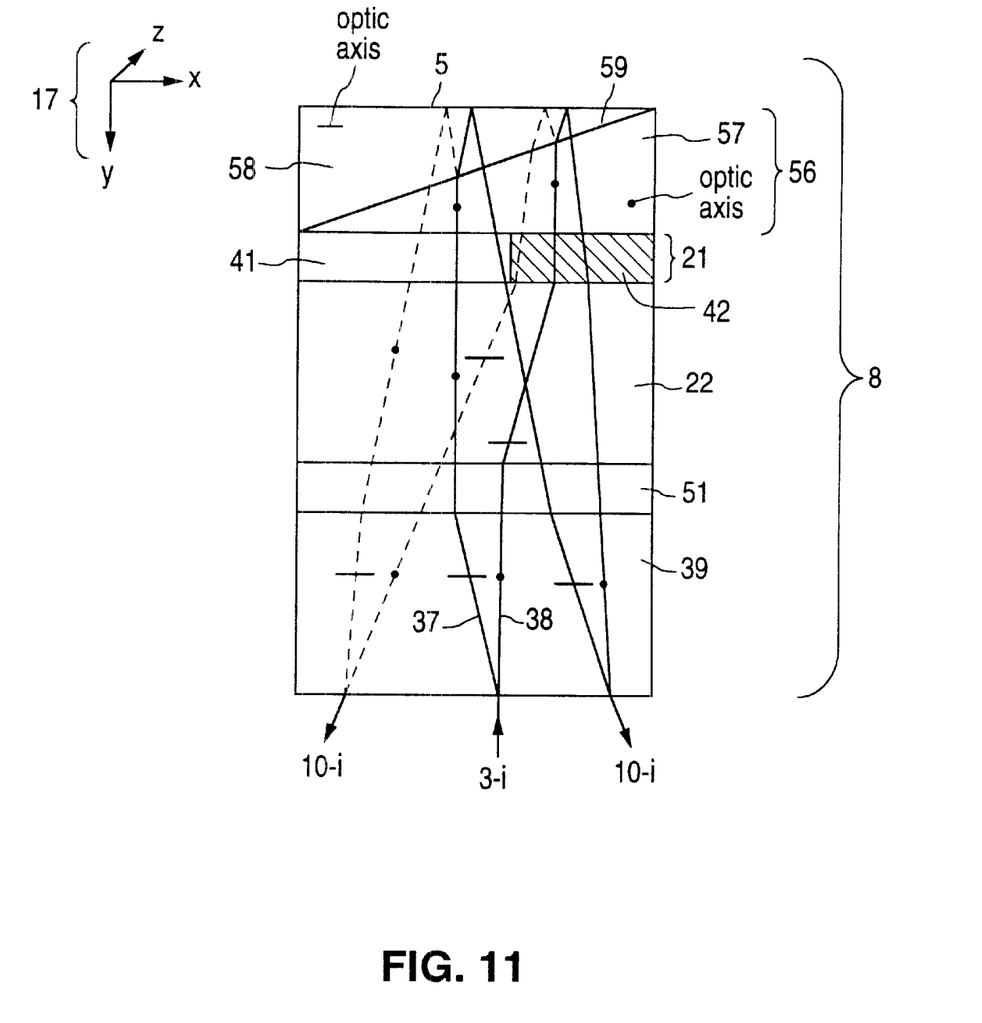
FIG. 11 schematically depicts two different paths in which a light ray can travel through an embodiment of the polarization steering device having a reflective Wollaston prism, a half-wave waveplate and two polarization beam displacers.

FIG. 11 shows another embodiment of polarization steering device 8 which includes birefringent polarization beam displacers 22 and 39, two-segment polarization modulator 21 (FIG. 9B), half-wave waveplate 51, and Wollaston prism 56. Birefringent elements 22 and 39 have optic axes lying in the x-y plane as defined by coordinate system 17. Thus, upon entering birefringent polarization beam displacer 39, sub-component 37 of input component 3-i that is polarized in the x-direction as defined by coordinate system 17 is displaced. On the other hand, sub-component 38 is polarized in the z-direction as defined by coordinate system 17 and passes through birefringent polarization beam displacer 39 without being refracted. For purposes of illustration, FIG. 11 indicates the polarization states of sub-components 37 and 38 with dots and lines. Dots indicate polarization in the z-direction and lines indicate polarization in the x-direction, as defined by coordinate system 17. Thus, after passing through birefringent polarization beam displacer 39, sub-component 37 is polarized in the x-direction as defined by coordinate system 17, and sub-component 38 is polarized in the z-direction as defined by coordinate system 17.

Sub-components 37 and 38 pass through half-wave waveplate 51 that has an optic axis oriented at forty-five degrees in the x-z plane as defined by coordinate system 17. Half-wave waveplate 51 reverses the polarization states of sub-components 37 and 38, polarizing sub-component 37 in the z-direction as defined by coordinate system 17 and polarizing sub-component 38 in the x-direction as defined by coordinate system 17. Half-wave waveplate 51 may be substituted by any element that rotates the polarization of a passing light ray by ninety degrees or an odd multiple of ninety degrees.

Sub-components 37 and 38 of perpendicular polarization states enter birefringent polarization beam displacer 22. Since the polarization directions of sub-components 37 and 38 are reversed, sub-component 38, which was not displaced by birefringent polarization beam displacer 39, becomes displaced when it passes through birefringent polarization beam displacer 22. In contrast, sub-component 37, which was displaced by birefringent polarization beam displacer 39, passes through birefringent polarization beam displacer 22 without being displaced. The optic axes of polarization beam displacer 22 and polarization beam displacer 39 are arranged in a way such that one polarization beam displacer (birefringent polarization beam displacer 22 in FIG. 11) displaces one of sub-components 37 and 38 in the x-direction and the other polarization beam displacer (birefringent polarization beam displacer 39 in FIG. 11) displaces the other sub-component in the negative x-direction as defined by coordinate system 17.

Sub-components 37 and 38 enter polarization modulator 21, which has sub-pixel 41-i and sub-pixel 42-i for each segment pixel 4-1 through 4-n, as shown in FIG. 11. As mentioned above, polarization modulator 21 may have two settings, setting C and setting D. Depending on the setting, sub-components 37 and 38 exit polarization modulator 21 polarized either in the x-direction or the z-direction as defined by coordinate system 17 when traveling toward Wollaston prism 56. For example, when sub-pixel 42-i is the rotating segment, as shown in FIG. 11, both sub-components 37 and 38 are polarized in the z-direction before entering Wollaston prism 56. On the other hand, when sub-pixel 41-i is the rotating pixel (this case is not shown), both sub-components 37 and 38 are polarized in the x-direction before entering Wollaston prism 56.

Sub-components 37 and 38, both polarized in the same direction, enter Wollaston prism 56. Wollaston prism 56 includes first birefringent material 57 and second birefringent material 58. First birefringent material 57 and second birefringent material 58 are positioned so that the optic axis of first birefringent material 57 lies perpendicular to the optic axis of second birefringent material 58. Thus, if the optic axis of first birefringent material 57 lies in the z-direction, the optic axis of second birefringent material 58 lies in the x-direction as defined by coordinate system 17. When sub-components 37 and 38 reach second birefringent material 58 that has an optic axis perpendicular to the optic axis of the first material, sub-components 37 and 38 are refracted.

The direction of refraction depends on the polarization direction. As mentioned above, a birefringent material, for example a birefringent crystal such as calcite or quartz, has an axis along which the ordinary ray travels and an axis along which the extraordinary ray travels. The indices of refraction along those two axes are not the same. For example, in the case of calcite, the index of refraction for the extraordinary ray ($n_e$) is smaller than the index of refraction for the ordinary ray ($n_o$). If the optic axis of first birefringent material 57 is positioned perpendicular to the optic axis of second birefringent material 58, a ray of light that travels along the axis for the extraordinary ray in first birefringent material 57 travels along the axis for the ordinary ray in second birefringent material 58. Likewise, a ray of light that travels along the axis for the ordinary ray in first birefringent material 57 travels along the axis for the extraordinary ray when it enters second birefringent material 58. According to Snell's law, the angle of refraction when a ray of light passes from first birefringent material 57 to second birefringent material 58 depends on the order of axes in which the ray of light travels.

If $n_e > n_o$ (as in yttrium orthovanadate) and sub-components 37 and 38 are polarized to travel as ordinary rays in first birefringent material 57 and as extraordinary rays in second birefringent material 58, sub-components 37 and 38 move into a higher index of refraction. Thus, Snell's law dictates that sub-components 37 and 38 refract toward the axis normal to interface 59 formed by first birefringent material 57 and second birefringent material 58. The paths of sub-components 37 and 38 in that situation are shown by the broken lines in FIG. 11. On the other hand, if sub-components 37 and 38 were polarized to travel as extraordinary rays in first birefringent material 57 and as ordinary rays in second birefringent material 58, sub-components 37 and 38 move into a lower index of refraction. In that case, sub-components 37 and 38 refract away from the axis normal to interface 59. The paths of sub-components 37 and 38 that refract away from the axis normal to interface 59 are shown with solid lines.

The surface of Wollaston prism 56 that is the farthest from dispersive medium 2 is coated with a reflective material to create reflective surface 5. The refracted sub-components reflect off reflective surface 5. The angle of incidence at which sub-components 37 and 38 strike reflective surface 5 depends on whether sub-components 37 and 38 were refracted toward or away from the normal upon entering second birefringent material 58.

One by two router 16 that utilizes polarization steering device 8 of FIG. 11 may use polarization modulator 21 segmented along the z-direction and the x-direction as defined by coordinate system 17 (see FIG. 9B). Depending on the setting of each segment pixel 4-i, incident sub-components 37 and 38 may be polarized to travel through Wollaston prism 56 from a low index of refraction to a high index of refraction, or from a high index of refraction to a low index of refraction. The former type of polarization steering devices produce output components that travel along the paths shown by broken lines, which propagate toward spot 31 on dispersive medium 2. The latter type of polarization steering devices produce output components that travel along the paths shown by solid lines, which focus on spot 32 of dispersive medium 2.

In the above disclosed embodiments of polarization steering device 8, a component or a sub-component passes through polarization modulator 21 at least twice. By passing light rays through polarization modulators at least twice, polarization steering device 8 produces output signals of high polarization contrast. If a polarization modulator produces a polarization contrast of 100:1, embodiments using polarization steering device 8 of the present invention achieves polarization contrast of $10^4$:1 without using a more expensive polarization modulator or two polarization modulators. The higher polarization contrast leads to a better component isolation and lower crosstalk between components.

In the above-disclosed embodiments, dispersive medium 2 causes a certain amount of polarization-dependent loss. This polarization-dependent loss can be minimized by, for example, inserting a half-wave waveplate between dispersive medium 2 and polarization steering device 8 for output components 10-1 through 10-n to pass through. Furthermore, the consistent travel distance among the components and sub-components within wavelength router 16 minimizes polarization mode dispersion. With polarization steering device 8 of the present invention, output components 10-1 through 10-n travel a substantially equal distance between entering and exiting wavelength router 16. If the thickness of birefringent polarization beam displacer 22 and the thickness of birefringent polarization beam displacer 39 along the y-axis are substantially equal, the configuration including half-wave waveplate 51 sandwiched between birefringent polarization beam displacer 22 and birefringent polarization beam displacer 39 ensures that the travel distances of sub-components 37 and 38 through polarization steering device 8 will be substantially equal. The substantially equal travel distances of sub-component 37 and sub-component 38 minimizes any polarization mode delay that might result in distorted or broadened signals. In an embodiment involving only one birefringent polarization beam displacer, sub-component 37 and sub-component 38 travel different distances between dispersive medium 2 and reflective surface 5 because only one of the two sub-components is refracted. Thus, the dual-birefringent polarization beam displacer configuration generally results in lower signal distortion than the single-birefringent polarization beam displacer configuration.

However, the thickness of birefringent polarization beam displacer 22 and the thickness of birefringent polarization beam displacer 39 may need to be adjusted independently in order to correct any polarization mode dispersion caused by other elements, for example Wollaston prism 56. Thus, the thickness of polarization beam displacers 22 and 39 need to be optimized in order to minimize the overall polarization dispersion while maintaining a substantially consistent travel distance for sub-components 37 and 38.

In addition, minimizing the thickness of birefringent polarization beam displacer 22, angled reflector 23, and Wollaston prism 56 (e.g., on the order of millimeters) helps achieve a secure isolation between the channels. The best channel isolation is achieved when the diameter of each of input components 3-1 through 3-n and output components 10-1 through 10-n are as small as possible as they pass through polarization modulator 21. In order to minimize the diameter of each input component 3-1 through 3-n and output component 10-1 through 10-n as they pass through polarization modulator 21, reflective surface 5 is located first focal length 60 (FIG. 1) away from lens 13. FIG. 7A, FIG. 10A, and FIG. 10B show that polarization modulator 21 and reflective surface 5 are separated by at least the thickness of birefringent polarization beam displacer 22 and angled reflector 23. Likewise, FIG. 11 shows that birefringent polarization beam displacer 22 and reflective surface 5 are separated by at least the thickness of Wollaston prism 56. However, reflective surface 5 being located first focal length 60 away from lens 13 results in polarization modulator 21 being located at a slightly defocused position. To minimize the defocusing effect on polarization modulator 21 (thereby keeping the passing components as narrow as possible), thickness of beam displacer 22, angled reflector 23, and Wollaston prism 56 must be kept small.

The embodiments described above are all reciprocal devices, and can be operated in the reverse direction. As a result, the invention includes a demultiplexer as well as a multiplexer. While the present invention is illustrated with particular embodiments, it is not intended that the scope of the invention be limited to the specific and preferred embodiments illustrated and described.

What is claimed is:

1. An optical router comprising:

at least one dispersive medium;

at least one reflective surface optically coupled to said at least one dispersive medium;

wherein an incident beam is separated into individual components by said at least one dispersive medium, each one of said individual components being reflected back to said at least one dispersive medium from said reflective surface and being recombined into one or more separate output signals;

a first birefringent element directing said individual components having a first polarization state and said individual components having a second polarization state in different direction;

a polarization modulator comprising
  a rotating segment to rotate the polarization of said individual components; and
  a non-rotating segment to not rotate the polarization of said individual components;
    wherein said segments are aligned along an axis substantially perpendicular to the direction in which said individual components travel through said polarization modulator; and
a second birefringent element directing said individual components having a first polarization state and said individual components having a second polarization state to different parts of said at least one reflective surface.

2. The optical router of claim 1 further comprising:
a lens located to focus said individual components onto segments of said polarization modulator.

3. The optical router of claim 1 wherein said at least one reflective surface is at least one surface of an angled reflector.

4. The optical router of claim 1 further comprising:
at least one polarization rotating element placed between said first birefringent element and said second birefringent element.

5. The optical router of claim 4 wherein the thickness of said first birefringent element and the thickness of said second birefringent element are substantially the same in the direction in which said individual components propagate.

6. The optical router of claim 4 wherein each of said individual components travel substantially the same distance between said at least one dispersive medium and said at least one reflective surface.

7. The optical router of claim 4 wherein the thickness of said birefringent element and the thickness of said second birefringent element are adjusted to minimize polarization mode dispersion in said optical wavelength router.

8. The optical router of claim 4 wherein the thickness of said birefringent element and the thickness of said second birefringent element are optimized to minimize polarization mode dispersion in said optical wavelength router while maintaining a substantially equal travel distance of said individual components between said at least one dispersive element and said at least one reflective surface.

9. The optical router of claim 4 wherein the combined thickness of said first birefringent element and said second birefringent element are minimized.

10. The optical router of claim 4 wherein said polarization rotating element is a half-wave waveplate with an optic axis inclined at forty-five degrees in the plane orthogonal to the direction in which individual components travel through said half-wave waveplate.

11. The optical router of claim 10 wherein at least one of said first and second birefringent elements comprises calcite crystals.

12. The optical router of claim 10 wherein at least one of said first and second birefringent elements comprises yttrium vanadate.

13. The optical router of claim 10 wherein at least one of said first and second birefringent elements comprises yttrium orthovanadate.

14. The optical router of claim 4 wherein said at least one reflective surface is a surface of a Wollaston prism farthest from the surface through which said individual components enter said at least one Wollaston prism, said at least one Wollaston prism comprising:
a first birefringent prism; and
a second birefringent prism adjacent to said first birefringent prism;
wherein the optic axis of said first birefringent prism is perpendicular to the optic axis of said second birefringent prism; and
wherein the optic axis of said first birefringent prism and the optic axis of said second birefringent prism are perpendicular to the direction in which said individual components travel through said first birefringent prism.

15. A method of routing a multiplexed optical signal comprising the acts of:
spatially separating said optical signal in a dispersive medium into individual components;
reflecting each of said individual components at different angles back into the dispersive medium, wherein said reflecting comprises:
  dividing each of said individual components into sub-components of different polarization states;
  passing said sub-components through a Wollaston prism, said Wollaston prism comprising:
    a first birefringent prism;
    a second birefringent prism adjacent to said first birefringent prism; and
    a reflective coating on the inner surface farthest away from said dispersive medium;
    wherein the optic axis of said first birefringent prism is perpendicular to the optic axis of said second birefringent prism; and
    wherein the optic axis of said first birefringent prism and the optic axis of said second birefringent prism are perpendicular to the direction in which said sub-components travel through said first birefringent prism;
  directing each of said sub-components to reflective surfaces positioned at different angles; and
combining said individual components in the dispersive medium into output signals.

* * * * *